United States Patent [19]
Alexander

[11] Patent Number: 5,490,604
[45] Date of Patent: Feb. 13, 1996

[54] COMPOSTER

[75] Inventor: Norman Alexander, Algonquin, Ill.

[73] Assignee: Shape Plastics Corp., Crystal Lake, Ill.

[21] Appl. No.: 728,380

[22] Filed: Jul. 11, 1991

[51] Int. Cl.$^6$ .................................................. B65D 6/16
[52] U.S. Cl. ..................... 220/4.34; 220/676; 220/692; 220/908; 71/9
[58] Field of Search ................... 220/4.29, 4.33, 220/4.34, 676, 692, 908; 71/9

[56] References Cited

U.S. PATENT DOCUMENTS

| | | | |
|---|---|---|---|
| 2,917,045 | 12/1959 | Waugh et al. | 220/4.34 |
| 3,246,828 | 4/1966 | Branscum et al. | 220/4.34 |
| 4,098,424 | 7/1978 | Liebscher et al. | 220/4.29 |
| 4,352,888 | 10/1982 | Tisbo et al. | 435/287 |
| 4,463,864 | 8/1984 | Roach | 220/4.34 |
| 4,597,503 | 7/1986 | Lates | 220/676 |
| 4,789,075 | 12/1988 | Sun | 220/4.34 |
| 5,052,570 | 10/1991 | Johansen | 220/4.33 |

FOREIGN PATENT DOCUMENTS

| | | | |
|---|---|---|---|
| 1337862 | 8/1963 | France | 220/4.34 |
| 0947059 | 8/1956 | Germany | 220/676 |
| 0141641 | 4/1920 | United Kingdom | 220/4.34 |
| 0855140 | 11/1960 | United Kingdom | 220/4.29 |
| 1339521 | 12/1973 | United Kingdom | 220/4.34 |

*Primary Examiner*—Allan N. Shoap
*Assistant Examiner*—Stephen Cronin
*Attorney, Agent, or Firm*—Paul H. Gallagher

[57] ABSTRACT

A plurality of identical wall panels connected together by removable rods driven through holes in adjacent corners of adjacent panels and into the ground. The device includes a cover which is shaped to fit four wall panels. Also, a greater number of panels can be used. The wall panels and cover each is a molded plastic member. The entire device consists of the wall panels, the cover, and the rods.

2 Claims, 2 Drawing Sheets

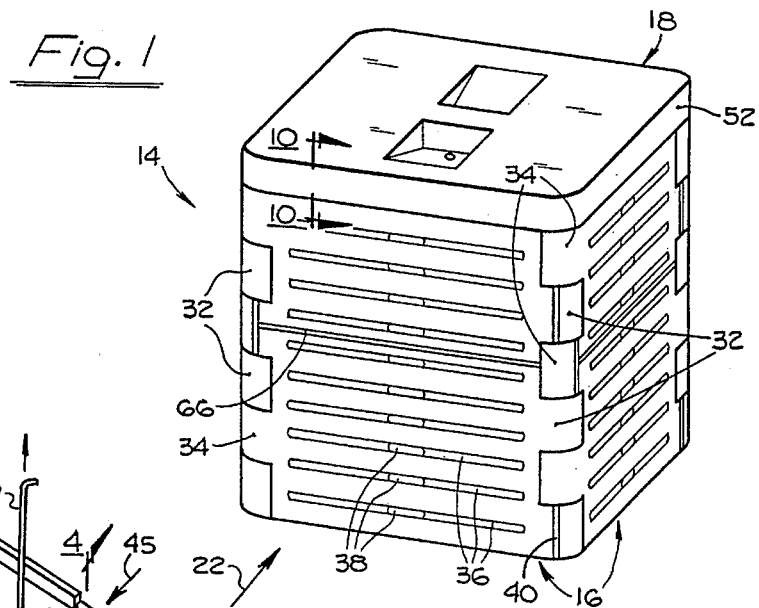
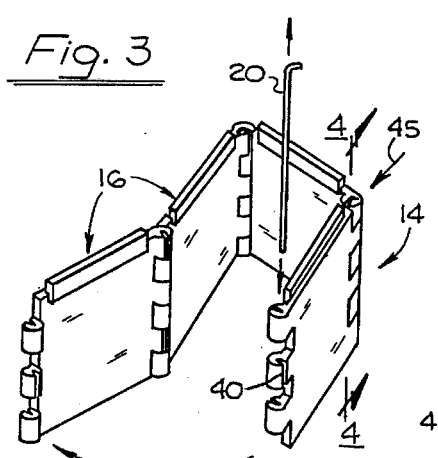
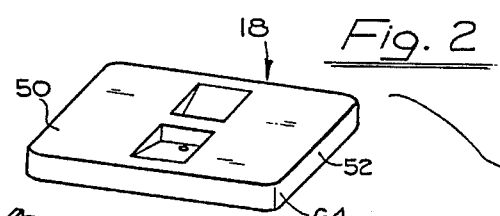
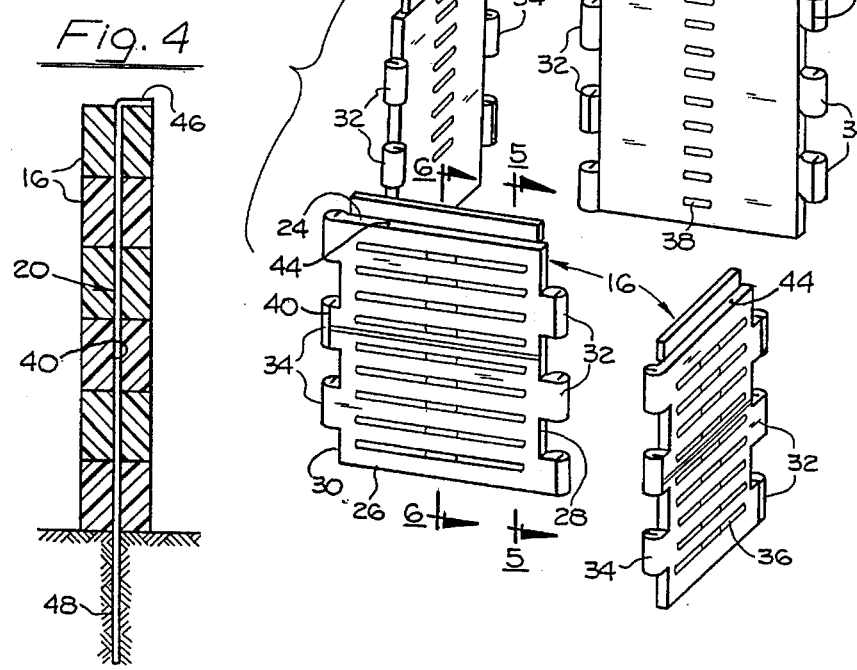

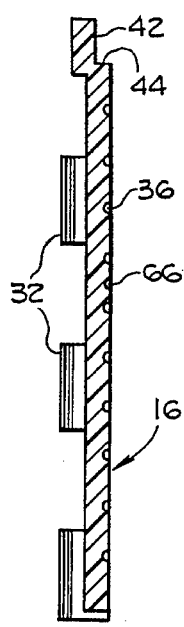
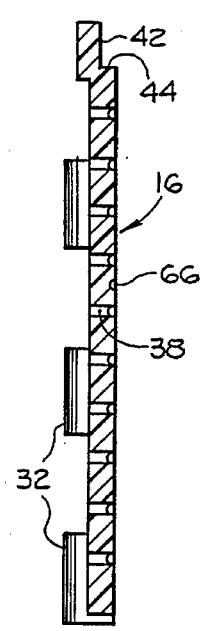
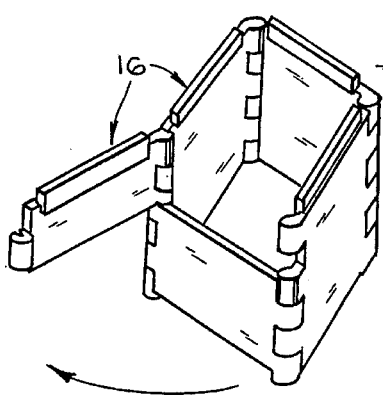
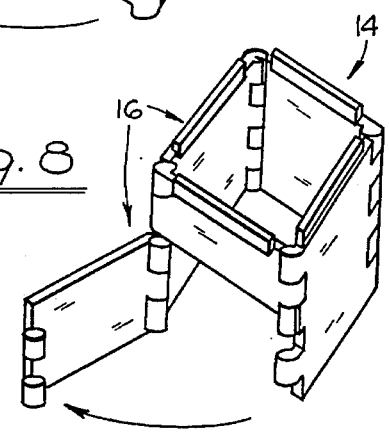
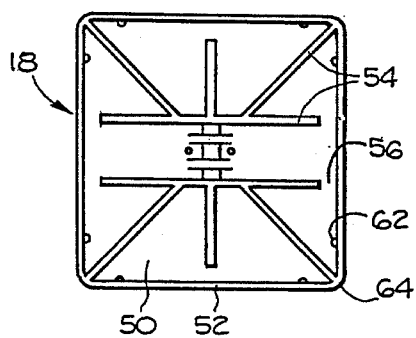
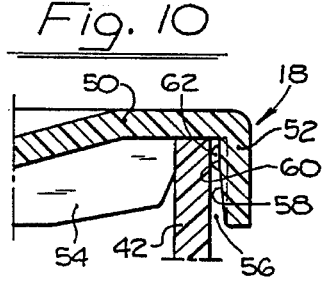
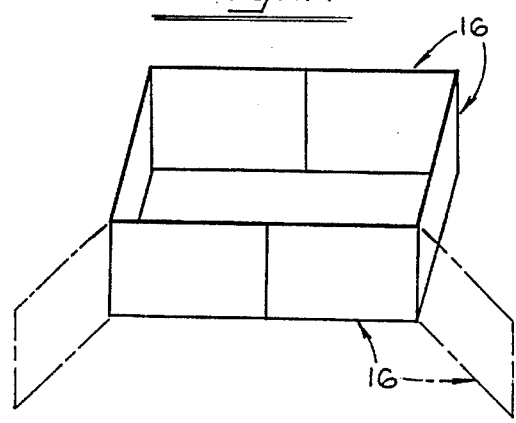
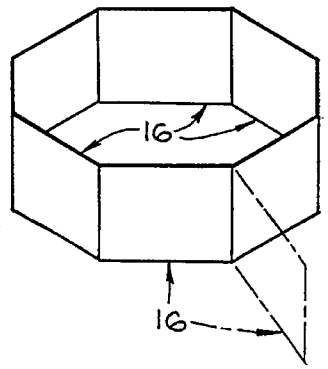

5,490,604

COMPOSTER

FIELD OF THE INVENTION

The invention resides in the general field of decomposing vegetable matter. A very common use to which it is put is gardening, where grass clippings, leaves, and various vegetable matter are decomposed, a process known as composting.

BRIEF SUMMARY OF THE INVENTION

A main object of the invention is to provide a composter or composting bin having the following features and advantages:

1. It is extremely simple in construction and use.
2. It is very light in weight and easy to handle.
3. It is made up principally of panels that are easy to interconnect to form the final device.
4. It includes a structural feature enabling the user to gain access to the interior from a side position, as distinguished from the top, for removing or stirring the contents of the device.
5. The device is extremely rugged, and includes a novel feature whereby it can be easily anchored to the ground.

BRIEF DESCRIPTION OF THE SEVERAL VIEWS OF THE DRAWINGS

FIG. 1 is a perspective view of the composter embodying the features of the invention.

FIG. 2 is an exploded perspective view of the parts making up the device.

FIG. 3 is perspective view of the composter without the cover, and with one of the panels in open position.

FIG. 4 is a sectional view taken at line 4—4 of FIG. 3.

FIG. 5 is a sectional view taken at line 5—5 of FIG. 2.

FIG. 6 is a sectional view taken at line 6—6 of FIG. 2.

FIG. 7 is a perspective view similar to FIG. 3, but with one of the panels divided to form two door sections, and with one of the door sections open.

FIG. 8 is a view similar to FIG. 7 but with another one of the door sections open.

FIG. 9 is a bottom view of the cover.

FIG. 10 is a sectional view taken at line 10—10 of FIG. 1.

FIG. 11 is a diagrammatic, perspective view of a composter made up of a greater number of panels, resulting in a larger device.

FIG. 12 is a view similar to FIG. 11 but showing a device made up of a still greater number of panels, resulting in a still larger device.

DETAILED DESCRIPTION

Referring in detail to the drawings, the composter or compost bin is shown in its entirety at 14 in assembled condition in FIG. 1, and in exploded condition in FIG. 2, showing all of the individual components and elements making up the device.

The composter is constituted by a plurality of wall panels or side panels 16, a cover panel or lid 18, and a plurality of rods 20. Each of the wall panels and cover is made of a one-piece, integral molded article.

The device, except for the rods 20, is made entirely of a molded plastic material, preferably high-density expandable polystyrene. This material is also known as EPS material. It may be of any of different selected strengths, such as 2½ pounds per cubic foot, it has high heat retention, and high composition rate. It will be understood of course that these specific dimensions and characteristics are not limiting.

The wall panels 16 are all identical, and for convenience in identification of the elements thereof, the following reference is relative to the orientation indicated by the arrow 22 of FIG. 1, the panel thus exposing an outer surface which is planar. The panel as so oriented (FIG. 2) includes a bottom edge 26 and top edge 24, a right-hand edge 28 and a left-hand edge 30.

Each wall panel 16 includes vertically spaced lugs 32 on the right-hand edge and vertically spaced lugs 34 on the left-hand edge with notches between adjacent lugs. These lugs 32, 34 are staggered relative to the opposite side edges of the panel. The panel may be provided with a plurality of grooves 36 for reducing the total amount of material used, and for decorative purposes. Each panel also is provided with a plurality of holes 38 for ventilation purposes.

Each of the lugs 32, 34 is provided with a vertical hole 40 (FIGS. 1, 4) for receiving the rods 20 in the assembly of the parts. These holes are in the form of grooves (FIG. 2) opening through the side surfaces of the respective lugs. Forming these holes as open slots, is an advantage in the molding procedure, facilitating the determining of the shape of the mold parts, and separating the parts after the molding step.

Each of the wall panels 16 includes at the top edge, an upstanding bead 42, which is offset inwardly from the outer surface, forming a top ledge surface 44.

The lugs 32, 34, as between the adjacent panels, form interconnecting elements for securing adjacent panels together. They also serve as hinge means for swinging one or more of the panels outwardly, as a door.

In setting up the composter, as a beginning step, the left-hand edge 30 of one panel is fitted to the right-hand edge 28 of an adjacent panel, with the respective lugs 34 of one panel fitted between the corresponding lugs 32 of the other panel. As mentioned above, the lugs are vertically spaced on each of the panels, and on the two panels considered together, they are staggered. The spacing between the lugs in each case is the same as the vertical dimension of the lug, whereby the lugs on the two panels fit together end-wise and form a continuous column, reaching from adjacent the bottom edge of the main portion of the panel and terminating at the top preferably flush with the ledge surface 44. In performing this step, the two panels are preferably placed at a 90-degree angle, with the two outer surfaces in a convex attitude, as indicated by the arrow 45 in FIG. 3. In this position the floors of the grooves forming the holes 38 are aligned, and one of the rods 20 is then inserted in the aligned holes. These grooves are staggered angularly relative to successive lugs vertically throughout the column so that the rod is held in place, and conversely both of the wall panels are held connected. Additionally the grooves forming the holes 40 in the case of the lugs at each side on a single panel, are staggered angularly so as to prevent that panel from being withdrawn sidewise from the adjacent panel. The rods have turned upper ends 46.

The rods 20 are of sufficient length to extend at least fully through all of the lugs making up a column, and preferably of greater length so as to penetrate into the ground as indicated at 48 (FIG. 4).

In many cases, if not most cases, a user would prefer the composter or bin to be of a size made up of four wall panels. Such a bin is shown in FIGS. 1 and 2, where the wall panels form a square, and the cover or lid 18 is provided for that size and shape bin. The cover 18 is a single panel, as noted above, having a top element 50 and a surrounding flange or skirt 52. The cover is provided with a plurality of strengthening ribs 54 on its undersurface. Certain of the ribs 54 are spaced at their ends from the flange, forming notches 56 (FIGS. 9,10) into which the beads 42 fit when the cover is placed on the wall panels. Each notch has a tapered entrance end 58 and a smaller inner portion 60. The flange 52 also is provided with knobs 62 which together with the ends of the ribs engage the bead and hold the cover snugly on the sidewalls.

The lugs 32, 34 are so dimensioned and located (FIGS. 5,6) that they do not extend outwardly from the outer surface of the panel, but extend inwardly therefrom, and when the wall panels are connected together, the interconnected lugs form a cylindrical surface continuing between the outer surfaces of adjacent panels. The flange 52 on the cover (FIG. 1) has curved corner elements 64 which register with the curved surface of the connected lugs.

A great advantage of the composter is that upon removing the cover and removing one of the rods 20 from the finished device, adjacent edges of the corresponding two adjacent panels are released, and one of those panels can be swung outwardly to open position as shown in FIG. 3. This opens the complete side of the device for providing access to the interior by the user, for removing the contents, or stirring it, etc. It will be of course understood that any one of the pins can be removed, and one of the corresponding panels swung to open position.

Any of the wall panels, or each of them, may be provided with a line 66 extending transversely and in line with and extending into a lug 34 (FIG. 1). This line may be a groove and indicates a position that the user may cut the panel transversely therealong and through the lug mentioned. This produces two door sections, upper and lower as shown in FIGS. 7, 8. FIG. 7 shows the upper section in open position and it will enable the user to gain access to the upper portion of the pile in the bin, while if the lower section is opened, as in FIG. 8, the user may remove a portion of the pile at the bottom. The positioning of the lines so as to run through the corresponding lug 34, leaves lugs, or lug portions, at the corresponding end of each panel section to provide vertically spaced hinges or hinge elements for each of the sections for maintaining the sections in proper position.

The size of the composter is not limited to four side panels. FIG. 11 shows a composter made up of six side panels, peripherally continuous, and in this case any one or more of the panels can be opened, as indicated.

FIG. 12 shows a composter of still a greater number of panels, in this case eight, and in this instance also, any one or more of the panels may be opened, upon removal of the corresponding rod 20.

I claim:

1. A composter comprising, a plurality of wall panels all of which are identical, and which are separate and detached from each other, and each having a bottom edge, and side edges, the panels being adapted to be set upright on their bottom edges with their side edges in engagement respectively around a space to be enclosed, a rod at each juncture of adjacent panels, each wall panel including lugs with holes therethrough on each side edge, spaced apart vertically forming notches between adjacent lugs, the lugs on each edge being so positioned relative to those on the opposite edge, that the lugs on each edge of each wall panel fit in the corresponding notches on the adjacent edge of the adjacent wall panel, the holes being in the form of slots opening through side edges of the lugs, and displaced angularly relative to adjacent lugs on adjacent wall panels in each juncture of the panels, the holes in all the lugs at each juncture of adjacent wall panels being capable of being aligned when the wall panels are in upright position for removably receiving the rods, all of the rods together securing all of the panels together, each wall panel, and thereby any selected one, including a transverse median line on which the wall panel can be cut to form upper and lower separate parts, and the median line being so located that when the selected wall panel is so cut, each of the upper and lower parts has at least two lugs on each side edge thereof.

2. A composter comprising, a plurality of rigid wall panels all of which are identical, and which are separate and detached from each other, each being of uniform material throughout its extent and each having a straight bottom edge, and side edges, the panels being adapted to be set upright on their bottom edges with their side edges in mutual engagement respectively around a space to be enclosed, and with their bottom edges being the only portions thereof engaging the ground, each panel being of one-piece construction and having vertically spaced lugs at its side edges with notches between adjacent lugs, the lugs on each side edge being staggered relative to those on the other side edge, progressing vertically, each lug having upper and lower surfaces that are flat and horizontal, whereby the lugs on each panel can be inserted into the corresponding notches in an adjacent panel in horizontal movement, the lugs on each side edge of each panel being spaced apart a distance identical with the vertical dimension of a lug, whereby the lugs together on adjacent edges of adjacent panels form a continuous and uninterrupted column, a plurality of rods separate from the panels, one rod at each juncture of adjacent panels, removably extended through openings in the lugs and operable for securing the panels together, and all of the rods securing all of the panels together, the panels when so secured together being circumferentially continuous without spaces between any adjacent panels and constituting an entire circumferentially surrounding wall of the composter, the panels extending the full length of, and thereby determining the height of, the surrounding wall, and the rods constituting the sole means securing the panels together, each panel having an outer surface, the panels having top edges which, when the panels are set upright, lie substantially in a common transverse plane, the composter including a cover constituted by a single, separate, one-piece panel, the cover and the side walls at the top edges of the latter having interengaging friction elements operable for releasibly holding the cover on the wall panels, and constituting the sole means for so holding the cover, the wall panel having upstanding beads on their top edges offset inwardly from the outer surfaces of the wall panels, forming ledge surfaces surrounding the beads, and the cover having a top element and a down-turned peripheral flange, and strengthening ribs on its outer surface, at least certain of the strengthening ribs having end surfaces adjacent to but spaced from the peripheral flange, forming notches receiving said beads on the wall panels, the peripheral flange and the ribs frictionally engaging the beads and constituting the means for holding the cover on the wall panels, and the peripheral flange engaging the ledge surfaces.

* * * * *